Figure 1:
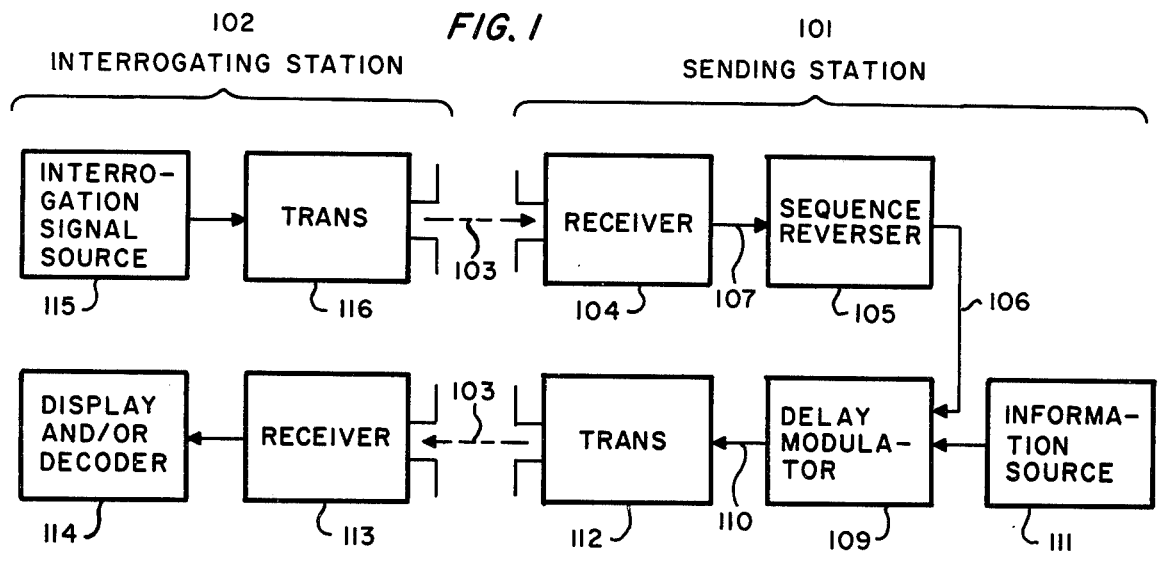

United States Patent [19]
Caputi, Jr.

[11] 4,151,524
[45] Apr. 24, 1979

[54] MULTIPATH COMMUNICATIONS SYSTEM
[75] Inventor: William J. Caputi, Jr., Northport, N.Y.
[73] Assignee: Cutler-Hammer, Inc., Milwaukee, Wis.
[21] Appl. No.: 421,755
[22] Filed: Dec. 24, 1964
[51] Int. Cl.² .............................................. G01S 9/56
[52] U.S. Cl. .................................. 343/6.5 R; 325/34; 343/6.8 R; 343/7.6
[58] Field of Search ..................... 343/6.5, 6.8, 100.7, 343/6.5 R, 6.5 LC, 6.8 R, 6.8 LC, 7.6

[56] References Cited
U.S. PATENT DOCUMENTS

| | | | |
|---|---|---|---|
| 2,546,985 | 4/1951 | Dodington | 343/6.5 R |
| 2,582,310 | 1/1952 | Chireix | 343/6.5 R |
| 3,209,317 | 9/1965 | Webster | 340/3 M |

Primary Examiner—S. C. Buczinski
Attorney, Agent, or Firm—Kevin Redmond

EXEMPLARY CLAIM

3. The method of modulating a dispersed pulse signal by a temporally sequential series of intelligence elements, comprising the steps of:
  (a) producing a series of component signals each substantially identical with said dispersed pulse signal but delayed with respect thereto by an amount corresponding to the time position of a respective intelligence element, and
  (b) modifying a characteristic of each of said component signals in accordance with the value of a similar characteristic of the respective intelligence element.

3 Claims, 3 Drawing Figures

MULTIPATH COMMUNICATIONS SYSTEM

This invention relates to improvements in the art of signalling by means of wave energy, wherein such wave energy travels over an appreciably dispersive transmission link. The term "dispersive transmission link" is defined as means for conveying a wave energy signal from one point to another, introducing different propagation delay times for each component of the signal. An example of such a link is one that consists of a plurality of paths of different lengths. Another is a link such as a cable that includes reactive elements which delay signal components of different frequencies by different amounts.

Dispersive transmission links are encountered unavoidably in radio communication, underwater signalling, and generally in any environment where reflection or refraction of wave energy occurs. Dispersion places an upper limit upon the rate at which information can be conveyed from one point to another because successive changes in the transmitted wave must, in order to be intelligible at the receiver, take place at intervals longer than the spread in propagation delay resulting from dispersion.

In some wave energy communication systems the required bandwidth, i.e. information rate, is small enough to be unaffected by dispersion phonomena. In others, such as television, dispersion effects are reduced by using highly directive receiving antennas, thus reducing the variety of propagation paths. This expedient is further extended in some point-to-point communication links by using similarly directive transmitting antennas.

The principal object of this invention is to provide methods of and means for point-to-point communication by means of wave energy travelling over a dispersive transmission link, such communication being affected at a band width or information rate substantially unlimited by dispersion.

Another object is to provide point-to-point communication of the above type with "geographical security," i.e. in such manner that the transmitted signals are more or less unintelligible at all locations other than the intended receiving point.

Other objects include the provision of methods and apparatus for signal processing to effect the foregoing general objects.

In brief, the above objects are accomplished in the practice of this invention by a form of round-trip signalling, in which the distortions caused by dispersion on the return passage are made to compensate those introduced by the initial passage. This is done by transmitting an interrogation signal from the station to which the communication is to be sent. The interrogation signal, distorted by dispersion, is received at the sending station, where it is processed to produce a similar signal that is reversed in time sequence. The sequence-reversed signal is transmitted back to the receiving station, undergoing essentially the same distortions as the original interrogation signal did.

As will be explained, this further distortion of the sequence-reversed version of the previously distorted interrogation signal compensates the previous distortion, with the result that the return signal received at the interrogating station is substantially a duplicate of the original interrogation signal. To transmit information, i.e. communicate, from the sending station to the interrogating station, the sequence-reversed signal is modulated before retransmission.

Modulation is effected by producing at least one further signal that is similar to the sequence-reversed version of the distorted interrogation signal, but delayed with respect thereto by an amount that represents the chronological position of an element of the intelligence to be sent, for example an information "bit". This technique is called "delay modulation."

Figure 3:
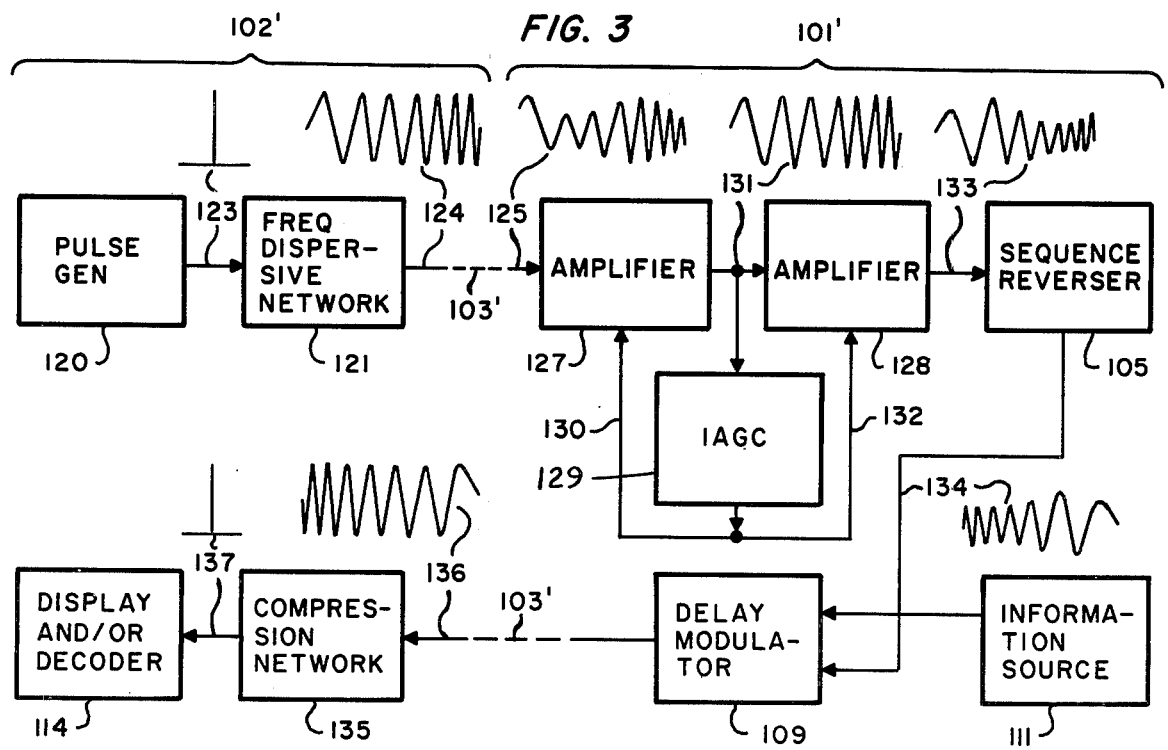
Figure 2:
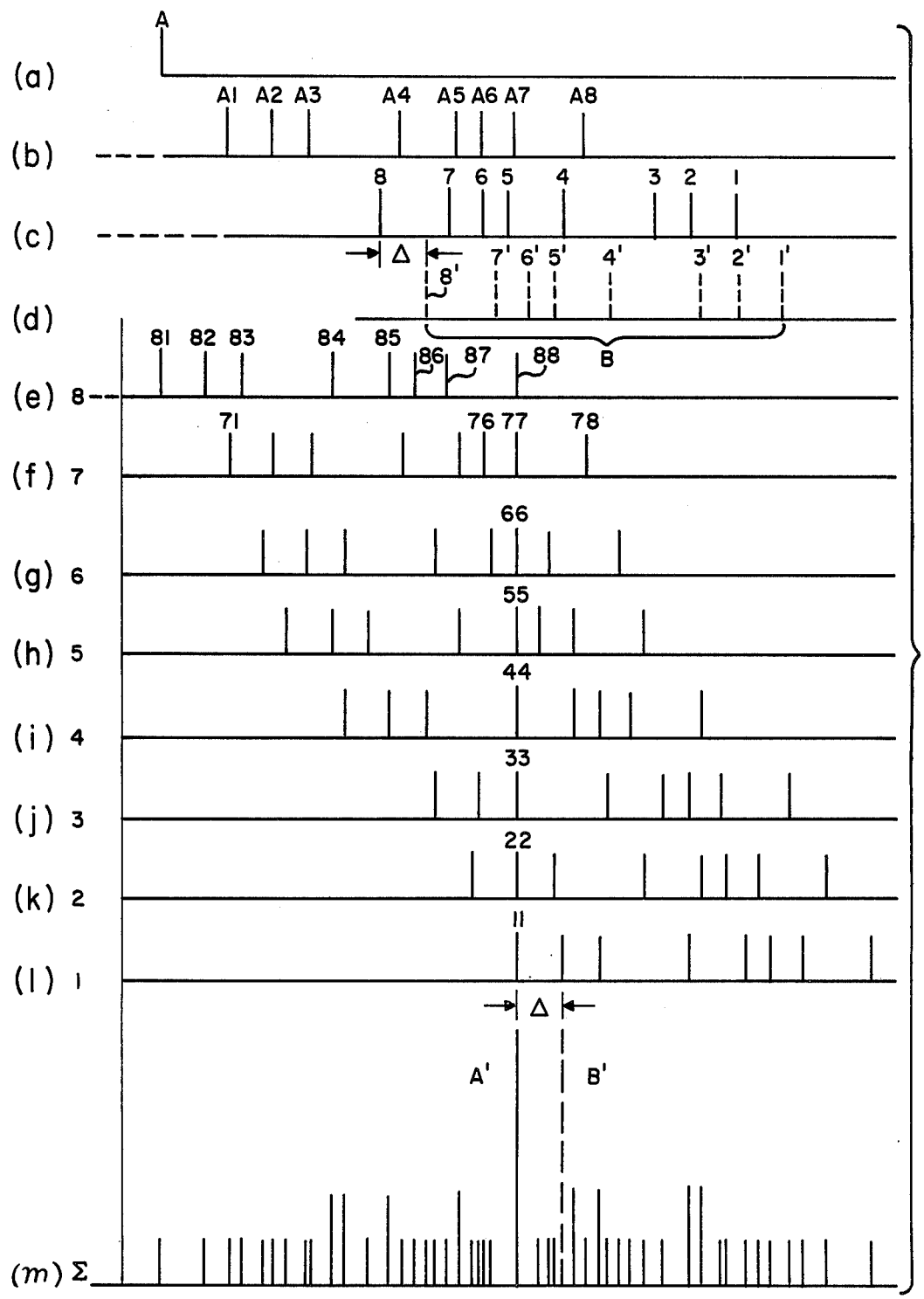

This invention will be described in more detail with reference to the accompanying drawing, wherein:

FIG. 1 is a block diagram of a complete communication system embodying the invention, FIG. 2 consists of a series of graphical representations (a) through (m) used in explaining the principle of operation of the system of FIG. 1, and FIG. 3 is a block diagram illustrating a modified embodiment of the system of FIG. 2.

Referring to FIG. 1, a sending station 101 and an interrogating-receiving station 102 are interconnected by a dispersive transmission link 103, indicated for example as a two-way radio link, assumed to be dispersive owing to multiple path propagation effects. The sending station 101 includes a receiver 104 for receiving interrogation signals, a sequence reverser 105 that accepts each received interrogation signal, stores it briefly, then puts out a signal on lead 106 that is a replica of the interrogation signal received on input lead 107 but reversed in temporal sequence.

A simple example of a sequence reverser device is a tape recorder arranged to record the interrogation signal as received, then run in the opposite direction while reproducing the recorded signal.

Other, more complex devices for this purpose are known in the art and ordinarily would be preferable for greater bandwidth capability and reduced time delay. For example, the sequence reverser may be a storage tube arranged to scan oppositely during writing and reading. Sequence reversal may also be effected by systems using dispersive filters and heterodyne arrangements with frequency-swept oscillators, as described in copending U.S. patent application Ser. No. 208,070, filed July 6, 1962 in the name of William J. Caputi, Jr.

The output of the sequence reverser 105 is applied to a delay modulator 109 which, in a simple form, may be a delay line combined with suitable amplifier and/or attenuator means in known manner to provide two paths for its input from lead 106 to its output on lead 110: one through the delay line and one direct. The amount of delay $\Delta$ represents the time position of an intelligence sample or an information bit to be sent from station 101 to station 102.

As an elementary example, the delay modulator may include a switch in the path through the delay line. Closure of the switch may be taken to represent a binary "one" or a "key down" condition, and will cause the output of the sequence reverser to be transmitted twice, with a delay $\Delta$ between the first and second transmissions. Opening of the switch represents a binary zero, or "key up" condition, and results in transmission of the sequence reverser output only once in response to each interrogation pulse.

For more efficient practical communication or data transmission, the delay line may be tapped at a plurality of points corresponding to respective time positions of a sequence of information bits to be transmitted and each provided with a switch that can be set to represent a binary zero or a binary one in that position. More generally, each time position can be used for an analog sample, not necessarily restricted to one of two discrete values. In such case, the switches may be replaced by smoothly variable devices such as adjustable attenuators.

The foregoing examples are given as illustrations of what is meant by "delay modulation." Various other known techniques may be employed to impress either digital or analog modulation on the dispersed and reversed interrogation signal. In any case the output of the delay modulator is the sum of successively delayed components, each similar to the input signal which is to be modulated, delayed according to the time position of the element of the modulating signal that it represents, and having an amplitude or phase corresponding to that of said element. The modulating signal is supplied by an information source 111.

The output of delay modulator 109 is transmitted by a transmitter 112 by way of link 103, and received at the interrogation station 102 by a receiver 113. The receiver signals are displayed and/or decoded by a device 114 for reproducing or otherwise utilizing information of the type provided by the source 111 at sending station 101.

Station 102 also includes an interrogation signal source 115, and a transmitter 116 for transmitting the interrogation signals over link 103 to the receiver 104 at sending station 101.

The operation of the system of FIG. 1 will be explained with reference to FIG. 2. For initial clarity of illustration, the following simplifying assumptions are made:
1. All individual pulses occurring in the operation of the system are of identical amplitude, at least at the locations where they are considered.
2. Pulses are either coincident or noncoincident; no partial overlapping is contemplated.
3. Pulses appearing coincidentally at the same point in the system add arithmetically to produce resultant pulses having amplitudes that equal the sum of the amplitudes of the individual pulses.

Referring to FIG. 2, line (a), the interrogation signal is represented as a single pulse A, of negligible duration with respect to any time intervals involved, other than the durations of other similar pulses. Although only one pulse A is shown, it may be assumed that this interrogation pulse is repeated at intervals short enough to accomodate any appreciable changes in the dispersive characteristics of the link 103.

FIG. 2, line (b) shows the interrogation signal as it arrives at sending station 101. It is assumed that the dispersive link 103 comprises eight propagation paths of various lengths, making the interrogation pulse A arrive as eight randomly spaced pulses A1 through A8. The time scale of line (b) is displaced to the left of that of line (a) in FIG. 2 to conserve space, and so does not show the whole propagation times, only the differences.

It will be seen that the brief pulse A of line (a) appears at station 101 as a relatively long series of similar pulses; if there were a large number of propagation paths, the effect would be substantially as if the interrogation pulse had been stretched or smeared into a single pulse having a duration corresponding to the difference between the shortest and longest propagation times.

Retaining, for the present, the assumption that the dispersive link 103 includes only eight distinct propagation paths, the pulses A1 through A8 are applied as they occur to the sequence reverser 105. After a systemic delay, which must be at least as long as the interval between A1 and A8, they emerge in reverse sequence as pulses 8 through 1, as shown in FIG. 2, line (c). Note that line (c) is displaced to the left with respect to line (b) to conserve space on the drawing. These pulses pass through the delay modulator 109 without any informationally significant delay, and are transmitted by transmitter 112 over link 103 to receiver 113. The first return pulse, pulse 8, is dispersed in the same manner as the interrogation pulse A was dispersed, and appears at station 102 as eight pulses 81 through 88, shown in FIG. 2, line (e).

Similarly, lines (f) through (l) of FIG. 2 show the groups of eight pulses each arriving at station 102 corresponding to pulses 7, 6, 5, 4, 3, 2 and 1 respectively transmitted from station 101. Lines (e) through (m) of FIG. 2 are aligned to a common time reference. All 64 pulses appear in the output of receiver 113, in general at different instants of time. Line (m) represents the summation of lines (e) through (l). There is one major coincidence, involving the eight pulses 88, 77, 66, 55, 44, 33, 22 and 11. The resultant pulse is designated A'. It is seen to be clearly distinct from the background of single pulses and minor coincidences, and is taken to represent the original interrogation pulse A after dispersion and reconstitution.

Line (d) of FIG. 2 shows, in dash lines, a group of pulses 8' through 1' identical with the group 8 through 1 but delayed by an interval Δ. This delay is that introduced by the delay modulator 109 as described above, and pulses 8' through 1' represent an information bit or intelligence element. Pulses 8' through 1' are transmitted and dispersed exactly as pulses 8 through 1, and their summation at the receiver 113 results in a similar major coincidence, shown at B' in line (m). The pulse B' is readily perceptible at station 102, and is detected and utilized in any desired manner by device 114 to reproduce the information originated at station 101 in source 111.

Some of the 64 pulses in the "B" train as received at station 102 could coincide with one or more "A" pulses to produce a somewhat higher undesired background than is shown on line (m). However, it can be seen in a semi-quantitative way that the greater the dispersion, the greater the signal-to-background ratio will be. Thus, if the pulse trains 8 through 1 and 8' through 1' were to occupy twice as long a time without increasing the individual pulse widths, the chances of random coincidence would be halved.

If there were sixteen discrete propagation paths instead of eight, the chances of random coincidence would be doubled and so would the background levels, assuming additive summation; but the major coincidence would also be doubled, comprising sixteen pulses. In actual practice, as distinguished from the simplified situation considered in FIG. 2, complete coincidence would almost never occur except between pulses such as 88, 77, 66, etc. The other, random, coincidences are generally partial and very rarely, if ever, result in a purely arithmetic summation.

Where the transmission link involves a carrier wave, as in the radio link of FIG. 1, any random near-coincidences will be discriminated against even when the pulse envelopes almost coincide exactly, because the respective carriers will be in random phase relationship and will combine vectorially so generally the resultant will be smaller than the arithmetic sum of the amplitudes.

The foregoing discussion with reference to FIG. 2 implies the assumption that the dispersive transmission link treats all frequency components of the signals exactly alike, i.e. that there is no frequency dispersion. Reflection or refraction of radio waves by the ionosphere generally introduces some frequency dispersion. Similar dispersion also occurs in other transmission links, such as cables and underwater signal systems. The effect of frequency dispersion on a short pulse such as A in FIG. 2, line (a) would be to broaden it during propagation, causing pulses A1, A2, etc. to be substantially wider than the interrogation pulse A.

This effect is also compensated by the system of FIG. 1, because the sequence of each individual frequency component is reversed at the sending station, and its respective propagation delays are accounted for in the manner depicted in FIG. 2, independently of the presence of other components.

Dispersive transmission links generally exhibit some form of frequency selectivity, that is, they tend to attenuate some frequencies more than others. In a multiple path link this effect can be caused by wave interference phenomona, making the amplitude of a received signal component very sharply frequency-dependent. The effect on a pulse is to distort its envelope, i.e. in the case of a short pulse, to lengthen it.

The system of FIG. 1 cannot compensate such frequency-dependent variations in amplitude because the amplitude of a pulse at each instant within its duration is the vector resultant of many components, of different frequencies. The frequencies of the contributing components at any instant cannot be inferred from the amplitude at that instant. Accordingly, the mere reversal and retransmission of the signal will not equalize the attenuations of the various frequency components. The frequency-dependent amplitude variations encountered on the return trip will simply enhance those already present, increasing the background level with respect to the desired signals.

Frequency-dependent variations in attenuation can be compensated by using signals in which the components of different frequencies appear in a definite predetermined temporal order rather than more or less simultaneously. Each component can then be treated individually according to its respective attenuation.

One way to accomplish this is to convert the interrogation signal to a relatively long frequency-swept "pulse" which is really a wave train of uniform amplitude that begins at one frequency and changes frequency in a uniform manner during the pulse, reaching some other frequency at the end.

The amplitude variations may be removed by limiting the interrogation signal received at the sending station, before reversing its sequence. This would compensate only half the total effect of frequency-dependent variations in attenuation because the sequence-reversed signal would undergo similar distortion in transmission to the interrogation station. Complete compensation can be achieved by "overlimiting" in such fashion that the amplitude variations in the received interrogation signal are reversed in sense, rather than removed.

As shown in FIG. 3, the frequency-swept interrogation pulse may be produced by a pulse generator 120 and a frequency dispersive network 121 that delays the different frequency components of the pulse 123 by different amounts in a uniform manner, thus converting the pulse 123 to a relatively extended wave train 124 that changes in a continuous monotonic manner from one frequency to another. In the illustrated case, the frequency increases during the swept pulse 124.

The dispersive transmission link 103' in FIG. 3 is assumed to include the transmitters and receivers 104, 112, 113 and 116 of FIG. 1, or equivalent means. During propagation to the sending station 101' the pulse 124 is distorted as has been described, arriving at station 101' with amplitude variations, as indicated at 125.

The previously mentioned "overlimiting" or amplitude reversal may be affected by a pair of cascade connected amplifiers 127 and 128 and a fast-acting so-called "instantaneous" automatic gain control circuit 129. In the IAGC circuit 129 the output level of amplifier 127 is continuously compared with a fixed reference, and any difference between the two is applied to the gain control input lead 130 of amplifier 127. The IAGC 129 and amplifier 127 are designed in known manner to remove substantially all amplitude variations from the envelope of the distorted pulse 125, resulting in a constant amplitude pulse 131.

The second amplifier 128 is nominally identical to amplifier 127, and its gain control input lead 132 is also connected to the IAGC 129. This varies the gain of amplifier 128 in the same way as the gain of amplifier 127 is varied, impressing corresponding amplitude variations on the input pulse 131 to produce an output pulse 133. Pulse 133 is like the received distorted pulse 125, except that the amplitude variations are reversed in sense.

The sequence reverser 105 of FIG. 3 reverses the sequence of pulses as in FIG. 1, although only one pulse is shown in FIG. 3. It also reverses the sequence of each individual pulse. Accordingly, both the envelope amplitude variations and the frequency variation of the wave train constituting the pulse 134 are temporally reversed with respect to those of the pulse 133. The delay modulator 109 and information source 111 are the same as the correspondingly designated elements in the system of FIG. 1.

The signals received at interrogation station 102' via link 103' are applied to a compression network 135 which, in the present example, may be identical with the dispersive network 121. The received pulse 136 is similar to the originally transmitted pulse 124, with the frequency sweep reversed. Redispersion in the network 135 compresses pulse 136 to produce a pulse 137, similar to the original pulse 123.

It can be seen from the foregoing explanation that the system of FIG. 3 treats each individual pulse to counteract the effects of frequency-dependent attenuation. It will also act like the system of FIG. 1 to counteract echo effects in which each transmitted pulse is received as a series of pulses, in the manner illustrated in FIG. 2. The frequency swept pulses are of longer duration than those indicated in FIG. 2, and therefore more likely to overlap when received than is indicated at line (m). However, the compression network compresses each frequency-swept pulse independently of the presence of the others, resolving it into a corresponding narrow pulse 137, and the system of FIG. 3 operates substantially the same way as was described with regard to FIGS. 1 and 2.

The operation of both systems depends upon identity of the dispersive link 103 or 103' for both directions of transmission between the sending station and the interrogating station. Moderate variations in the characteristics between an interrogation and the return signal will merely increase the background level somewhat. A third station, at some location other than that of the interrogating station, could intercept signals from the sending station. However, unless the dispersion of the link between the sending station and the third station happens to be the same as that between the sending station and the interrogating station, the intercepted signals will not coalesce in the manner illustrated in FIG. 2.

If the dispersions of the two links differ sufficiently, taking the information rate into account, the signals received at the third station will be unintelligible and substantially undecipherable. This phenomenon is referred to as geographical or spatial security, and is of obvious advantage in point-to-point communication. If desired, sufficient dispersion (and hence difference between the intended and the intercepting links) can be insured, for example, by transmitting and/or receiving with a broad beam directed toward the earth's ionosphere, as in the so-called "scatter" communication systems presently used for signalling beyond line-of-sight distances.

I claim:

1. The method of communicating from a first station to a second station over a dispersive transmission link, comprising the steps of:
   (a) transmitting from the second station an interrogation signal of such bandwidth that it is distorted upon arrival at the first station,
   (b) receiving said distorted signal at the first station,
   (c) producing a signal that is substantially a replica of the received distorted signal but reversed in time sequence,
   (d) delay modulating said replica signal by intelligence to be communicated from said first station to said second station to produce components each identical to said replica signal but amplified, phase shifted and delayed with respect thereto by amounts equal to, respectively, the amplitude, phase and time position of the element of said intelligence that it represents,
   (e) transmitting said delay modulated signal from said first station to said second station over the same dispersive transmission link as said interrogation signal, whereby each component of said modulated signal undergoes the same distortions in traveling from the first station to the second as said interrogation signal does in traveling from said second station to said first station and the sum of said redistorted components received at said second station is intelligible representation of said modulating intelligence.

2. The method of communicating from a first station to a second station over a dispersive transmission link, comprising the steps of:
   (a) transmitting from the second station an interrogation signal comprising a frequency-swept pulse,
   (b) receiving at the first station said interrogation signal as distorted by said dispersive transmission link,
   (c) reversing the amplitude sense of the variations in the envelope of said received signal,
   (d) producing a signal that is substantially a replica of the amplitude-reversed signal but reversed in time sequence,
   (e) delay modulating said replica signal in accordance with intelligence to be communicated from said first station to said second station,
   (f) transmitting said delay modulated signal from said first station to said second station over the same dispersive transmission link as said interrogation signal,
   (g) receiving said delay modulated signal at said second station,
   (h) compressing said received signal to form respective discrete component pulses, and
   (i) determining said intelligence from the summation of said component pulses.

3. The method of modulating a dispersed pulse signal by a temporally sequential series of intelligence elements, comprising the steps of:
   (a) producing a series of component signals each substantially identical with said dispersed pulse signal but delayed with respect thereto by an amount corresponding to the time position of a respective intelligence element, and
   (b) modifying a characteristic of each of said component signals in accordance with the value of a similar characteristic of the respective intelligence element.

* * * * *